United States Patent Office 3,547,678
Patented Dec. 15, 1970

3,547,678
ELECTROPHOTOGRAPHIC SHEET AND METHODS OF PRINTING
Kenneth E. Conley, Chillicothe, Ohio, assignor to The Mead Corporation, Dayton, Ohio, a corporation of Ohio
No Drawing. Continuation-in-part of application Ser. No. 459,866, May 28, 1965. This application June 28, 1968, Ser. No. 741,226
Int. Cl. G03c 1/74
U.S. Cl. 117—34                     3 Claims

ABSTRACT OF THE DISCLOSURE

The present invention relates to a method of producing cast surface coated electrophotographic surfaces from aqueous alkaline coating compositions comprising photoconductive pigments, dilute alkalies, and binders comprising electrically insulating synthetic organic polymers containing sufficient carboxyl groups to render the polymer soluble in dilute alkali solutions. When coatings of such composition are coagulated with film-forming organic polymeric acids, such as polyitaconic or polyacrylic acids, prior to casting, the resulting cast surfaces are very smooth and especially useful in electrophotographic printing process where good resolution of the image is important and/or the image is transferred before fusing.

---

This is a continuation-in-part of United States Serial No. 459,866 filed May 28, 1965, now abandoned.

The production of both electrophotographic and cast coated surfaces is well known. However, production of cast coated electrophotographic surfaces of satisfactory characteristics and in an economical manner has not previously been possible because of various manufacturing problems. For example, electrophotographic recording elements for certain purposes require surfaces having specific properties, including a high degree of smoothness. In the production of cast coated surfaces using aqueous coating compositions, production and removal from the casting drum of sheets which are relatively free from surface defects has presented numerous problems. Certain of these problems have been resolved by coagulating the coatings before they are contacted with the casting surfaces. However, the particular method of coagulation has been found to be quite important and previously suggested methods of effecting coagulation have not been found to give satisfactory results. Applicant has now found that by using a particular type of binder in the electrophotographic coating and effecting the coagulation of the coating before casting with a particular type of coagulation agent that many of the previous difficulties are overcome and a high grade of cast coated electrophotographic surface suitable for special purposes is obtained.

In his improved process, applicant uses as the electrophotographic coating composition an aqueous alkaline composition comprising a photoconductive pigment and as the binder an electrically insulating synthetic organic polymer containing sufficient carboxyl groups to render the polymers water soluble in the presence of dilute alkalies. Such binders are well known in the art and include materials such as the alkali-soluble copolymers of ethylenically unsaturated monomers such as styrene, acrylic esters, vinyl esters and vinyl ethers with ethylenically unsaturated carboxylic acids such as itaconic acid, maleic acid, acrylic acid, crotonic acid, the homopolymers of itaconic and acrylic acids, copolymers containing both acrylic and itaconic acids, and the like, the only requirement in the case of the copolymers being that sufficient acid be copolymerized with the monomer so that the resulting copolymer contain sufficient carboxylic radicals as to render the copolymer soluble in water in the presence of dilute alkali.

The photoconductive pigment can be any of the conventionally used inorganic photoconductive pigments such as, for example, zinc oxide, titanium dioxide, zinc sulfide, cadmium sulfide, titanium sulfide, cadmium selenide, or other finely divided inorganic photoconductive material.

Other materials conventionally used in electrophotographic coatings such as dispersants, wetting agents, fillers, and the like, may also be included in the composition, as desired or needed.

In preparing the aqueous alkaline coating composition of the present invention, any suitable alkaline neutralizing agent may be used in an amount sufficient to render the binder soluble in the presence of zinc oxide. While a nonvolatile alkali, such as sodium hydroxide or potassium hydroxide, may be used to solubilize the binder, it is preferred in the case of electrophotographic coatings to use a volatilizable alkali such as ammonium hydroxide or substituted ammonias such as diethylamine, morpholine or the like, which can be readily removed from the coating by volatilization during drying thereof. The use of alkalies which are not readily removable from the coating during drying is not advantageous since such alkalies, or salt thereof which remain in the dried coating, usually are charge carriers and cause rapid discharge of the electrostatic charges applied to the coated surface and thus make electrostatic printing difficult or impractical.

It has previously been known to coagulate coatings before the latter are subjected to the cast drying operations. For example, U.S. patent 2,950,214 granted Aug. 23, 1960 shows such an operation wherein the coating was coagulated with an electrolyte. Use of such coagulating agents in production of cast surface coated electrophotographic elements is, however, impractical because the resulting cast surface coated surfaces are highly electrically conductive and, hence, their use in electrophotographic reproduction operations is entirely impractical because of the rapid discharge of electrostatic charges used in applying images to the surfaces. For similar reasons, use of organic acids such as aliphatic or aromatic acids is also impractical. Applicant, however, has now discovered that when film-forming organic polymeric acids such as, for example, polyitaconic or polyacrylic acids, or copolymers thereof, are used as the coagulating agent in producing cast surface coated electrophotographic surfaces and when using the type of binder specified above, cast surface coated electrophotographic elements of high quality are produced without experiencing any of the difficulties of the prior art processes.

When used as coagulating agents for aqueous alkaline electrophotographic coating compositions containing as the binder electrically insulating synthetic organic binders containing sufficient carboxyl groups to render the said polymers soluble in water in the presence of zinc oxide, the film-forming organic polymeric acid is preferably used in the form of 1–10%, by weight, aqueous solutions. When the concentration is below 1%, the rate of coagulation is generally too slow; at concentrations above 10%, the viscosity of the acid solution is generally too high for practical purposes. The maximum viscosity which can be is 700 c.p.s. as measured by a Brookfield Viscosimeter using the No. 2 spindle at 60 r.p.m.

The process of the present invention can be carried out generally as described in U.S. patent 2,950,214, supra, or in other previous processes involving coagulation of the coating prior to bringing the latter into contact with a smooth surface against which it is dried. In such processes, the electrophotographic coating composition is applied to a suitable substrate, preferably a moving sheet of paper, by any conventional method which permits addition of a smooth, compact layer of coating of regulated thickness. To this undried coating is then applied by any convenient method an aqueous 1–10%, by weight, solution of a film-forming organic polymeric acid, such as polyacrylic or polyitaconic acid. This may be conveniently done by spraying or by running the sheet over a drum dipping into a bath of the dilute aqueous coagulating agent in a manner such that the coagulating agent contacts substantially only the coated surface of the paper. The point of application of the coagulating agent is regulated depending on the speed of the coated sheet so that coagulation of the surface has progressed to a point where at least the surface of the coating is in the form of a nontacky, tough but deformable gel when it is brought into contact with the smooth surface on which it is dried. The freshly coagulated sheet is preferably rolled onto the smooth surface, which is preferably a heated drum, so as to establish complete contact between the smooth surface and the coating to be dried. This may be accomplished by any conventional means. The drying of the coating against the smooth surface is then effected in a conventional manner. Usually the temperature of the smooth drying surface is maintained at 80–100° C. but the actual temperature is determined by various factors, such as the size of the drum, the speed of the coated sheet, the thickness and composition of the coating, etc. In other words, except for the composition of the coating and the type of coagulating agent used, the casting procedure may follow conventional prior art methods.

The following specific examples are given to illustrate the invention. It is understood, however, that the invention is not limited thereto but such variations therefrom as will be obvious to one skilled in the art are intended to be covered by the appended claims.

EXAMPLE I

An electrophotographic coating composition was prepared as follows:

| | Parts by weight |
|---|---|
| Photoconductive zinc oxide | 91.5 |
| 95% vinyl acetate-5% crotonic acid copolymer | 7.2 |
| Ammonium hydroxide (26° Baumé) | .68 |
| Melamine resin | 1.3 |
| Denatured alcohol | 1.2 |

The copolymer, ammonium hydroxide, alcohol and sufficient water to bring the mixture to approximately 40% solids were added to a kneader. After mixing until lump-free, the zinc oxide was added and kneading continued until a good consistency was obtained. After completion of the kneading, water was added to give approximately 72% solids and a viscosity of approximately 17 poises.

The electrophotographic coating composition prepared as above described was then applied by a reverse roll coater to paper at an approximate coat weight of 20–25 pounds per 3300 square feet. Both unsized and pigmented tub sized sheets were used. Likewise, coatings were applied to sheets to which had previously been applied a base coating.

The above sheets carrying the coating of electrophotographic composition were then moved while still wet, through an aqueous bath containing 5%, by weight, polyacrylic acid, preferably in a manner so that only the coated side of the paper was contacted by the polyacrylic acid solution. Upon leaving the coating bath, the paper sheet carrying the partially gelled coating was passed while in the form of a non-tacky, tough but deformable gel, to a smooth surfaced finishing drum through a nip formed by an adjacent roll and was thereby pressed into contact with the smooth surfaced heated finishing drum with which it was held in close contact until the coating was dried and the sheet released from the heated drum without leaving adhesion marks or other defects on the surface of the coated paper.

It was found that by using electrophotographic sheets prepared as above described, the electrophotographic prints obtained from such paper were of unexpectedly good quality. It was further found that a printed sheet used as an offset master produced better results and more good copies than could be obtained from a similar sheet produced from an electrophotographic coating of the above composition which were not coagulated and cast as above described. Sheets prepared as above described were particularly useful in electrophotographic processes where good resolution of the image was important and where the image was transferred before fusion.

EXAMPLE II

This experiment was carried out as described in Example I using as the coagulent a 7%, by weight, aqueous solution of polyacrylic acid and an electrophotographic coating composition similar to that of Example I with the exception that the binder used comprised a copolymer of vinyl methyl ether and maleic acid. The resulting cast surface coated paper was similar in quality to that described in Example I.

EXAMPLE III

This experiment was also carried out as described in Example I except for the fact that the coagulent solution was a 3%, by weight, aqueous solution of polyitaconic acid, and the binder used in the electrophotographic coating composition was polyacrylic acid. The quality of the dried cast surface coated electrophotographic paper was similar to that produced in accordance with the procedures of Examples I and II.

EXAMPLE IV

In this experiment, 60 grams of photoconductive zinc oxide was slurried in 30 grams of water to produce a thick mud-like consistency. An itaconic acid-acrylic acid copolymer having a molecular weight of about 200,000 and sold by Chas. Pfizer & Co. under the tradename Policon D, was adjusted with ammonium hydroxide to a pH value of about 8.7 and diluted to about 19% copolymer content. One gram of this diluted mixture was then thoroughly mixed with the zinc oxide slurry until the mud-like consistency of the slurry became almost water thin. After thorough working of the slurry to assure good dispersion, 51 grams of the diluted polymer was then stirred into the above mix. The resulting mixture was then applied to a suitable paper base stock in accordance with known techniques. This coating was then coagulated, as described in Example I, with polyacrylic acid in the form of a 5%, by weight, aqueous solution. The resulting cast surface coated electrophotographic paper was of unusually high quality and gave excellent reproductions after one thousand copies.

What is claimed is:

1. In a method of producing cast surface coated electrophotographic recording elements, the steps which comprise contacting on a suitable substrate an aqueous electrophotographic coating comprising a photoconductive pigment, a volatile alkali, and an electrically insulating synthetic organic polymer binder containing sufficient carboxyl groups to render said polymer water soluble in the presence of dilute alkali with 1–10%, by weight, of an aqueous solution of a film forming organic polymeric acid selected from the group consisting of polyitaconic acid, polyacrylic acid and copolymers of itaconic acid and acrylic acid until said coating is coagulated to the form of a non-tacky, tough but deformable gel, and while in a gelled condition bringing said coagulated coating into intimate contact with a smooth casting surface and drying same in direct contact therewith.

2. Method according to claim 1 wherein said binder is selected from the group consisting of alkali soluble copolymers of styrene, acrylic esters, vinyl esters and vinyl ethers with ethylenically unsaturated acids selected from the group consisting of itaconic acid, maleic acid, acrylic acid, crotonic acid, homopolymers of itaconic acid and acrylic acid and copolymers containing both itaconic and acrylic acids.

3. Method according to claim 1 wherein said dilute alkali is selected from the group consisting of ammonium hydroxide, diethylamine and morpholine.

References Cited

UNITED STATES PATENTS

| | | | |
|---|---|---|---|
| 2,706,431 | 8/1956 | Beatty | 101—457 |
| 2,875,054 | 2/1959 | Griggs | 117—34 |
| 2,919,205 | 12/1959 | Hart | 117—64 |
| 3,047,391 | 7/1962 | Malm | 117—34 |
| 3,077,398 | 2/1963 | Jones | 117—64 |
| 3,160,503 | 12/1964 | Cady | 117—34 |
| 3,261,709 | 7/1966 | Shulman | 117—155 |
| 3,403,116 | 9/1968 | Ream | 96—1.5 |
| 3,454,415 | 7/1969 | Bonjour | 117—34 |

FOREIGN PATENTS

| | | | |
|---|---|---|---|
| 888,371 | 1/1962 | Great Britain | 96—1.8 |

WILLIAM D. MARTIN, Primary Examiner

W. R. TRENOR, Assistant Examiner

U.S. Cl. X.R.

96—1.5, 1.8; 101—457; 117—64